United States Patent Office 3,296,167

Patented Jan. 3, 1967

3,296,167

PROCESS FOR POLYMERIZING AN ETHYLENICALLY UNSATURATED AMINE-CONTAINING MONOMERIC MIXTURE

Robert J. Turner, Lake Geneva, Wis., and Clifford M. Lutes, Jr., Woodstock, Ill., assignors to Morton International Inc., a corporation of Delaware No Drawing. Filed Feb. 2, 1962, Ser. No. 170,797
6 Claims. (Cl. 260—29.6)

This invention relates to improvements in the production of polymer latices and more particularly to an improved process for the production of alkali resistant, acid sensitive interpolymers in latex form and the products produced by said improved process.

The use of synthetic polymeric materials, especially in latex form in the formulation of floor polishes, protective coatings, waxes and finishing compositions, and the like, is well known in the art. These coating and polish formulations are conventionally aqueous dispersions containing synthetic polymers, usually in latex form, which when applied to surfaces, dry to a smooth glossy film. The synthetic polymers conventionally used in such coating materials contain functional groups, such as carboxylic acid groups, which are sensitive to alkaline materials and permit attack and eventual removal of the film by alkaline materials, such as detergents, soaps or the like.

The use of these synthetic polymers which are sensitive to alkali is subject to certain inherent drawbacks inasmuch as soap, detergents or other alkaline cleansing aids are commonly utilized in areas, such as in kitchens or where contact with the finishing compositions is likely, particularly when spilled on a polished floor surface where they attack the film or coating and remove the same. This leaves unsightly spots and permits the accumulation of dirt on the unprotected surface.

The alternative of using inert polymeric materials is not practical, since the only known method of removing such inert polymers is by the use of organic solvents and many surfaces to which such coatings are applied, such as asphalt tile, linoleum or plastic tile, are subject to attack by these materials.

The production of acid-sensitive, alkali-resistant polymeric materials and their use in protective and decorative coatings are described in the copending application of Turner, Serial No. 85,494, filed January 30, 1961. While the polymeric products described in this application are well suited for the particular uses set forth therein, they require, for a balance of properties and particularly acid sensitivity, the inclusion of a certain amount of amine-containing co-monomer.

The procedure described in that application involve the polymerization of a predetermined amount of amine containing monomer in admixture with other monomeric materials. The amount of amine containing monomer determined the acid sensitivity of the polymer made therefrom and those polymers which contained the greater amount were more sensitive to acid. Inasmuch as the amine-monomer is the more expensive ingredient, it would be advantageous and desirable to provide a polymer which has the properties of acid sensitivity but has a reduced amine-containing monomer content.

Accordingly, it is an object of the present invention to provide an improved process for preparing an amine containing polymeric material which has a reduced amine-monomer content but retains its acid sensitivity.

Another object is the preparation of polymeric compositions which are acid sensitive but have a reduced amine-monomer content by the aforesaid improved process.

These and other objects of the invention may be understood by reference to the following specification, including the specific examples and appended claims.

Accordingly, the fulfillment of the foregoing and other objects is provided by one form of this invention which is an improved process for preparing an interpolymer latex by the interpolymerization of from about 5 to 25 percent by weight of an amine-containing polymerizable monomer and from about 75 to 95 percent by weight of at least one alpha-beta unsaturated polymerizable comonomer in an aqueous emulsion polymerization reaction, the said improvement comprising adding and polymerizing, in the course of said reaction, an amine monomer-enriched premix fraction of said monomers wherein said amine-containing monomer is present in an amount of from about 10 to 100 percent by weight of said fraction and wherein said fraction constitutes from about 10 to 70 percent by weight of the total monomeric constituents.

A further embodiment of this invention is an interpolymer latex formed in accordance with the foregoing improved process.

It should be understood that by the terms "acid soluble" and/or "acid sensitive" is meant that the polymeric materials or more particularly the films and coatings formed therefrom are softened or at least partially solubilized by the action thereon of dilute aqueous solutions of acid, such as acetic, citric, hydrochloric, tartaric, or the like, and that said films or coatings which are formed on surfaces and contain these polymers are thereby rendered removable by the action of such acid.

The amine containing polymerizable monomer used in the process of this invention is selected from the group consisting of vinylpyridines, ethylpyridylethyl acrylate, vinylbenzylamines, vinylphenylamines, N-methyleneaminoacrylamides and compounds of the formula:

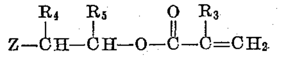

wherein Z is selected from the group consisting of piperidine, morpholino and amino radicals of the structure

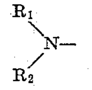

wherein $R_1$, $R_2$, $R_4$ and $R_5$ are selected from the group of hydrogen and lower alkyl and $R_3$ is selected from the group of hydrogen and methyl. The acrylamides referred to are preferably of the structure

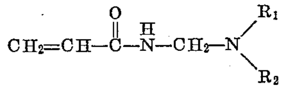

wherein $R_1$ and $R_2$ are as previously defined. Exemplary of such amine containing monomers are 2-vinylpyridine, 2-morpholinoethyl acrylate and methacrylate, t-butylaminoethyl acrylate and methacrylate, diethylaminoethyl acrylate and methacrylate, dimethylaminoethyl acrylate and methacrylate, ethylpyridylethyl acrylate, vinylbenzylamines, vinylphenylamines, and the like.

The vinylpyridines and vinylbenzylamines may be exemplified by the structures

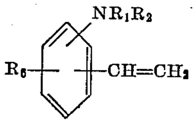 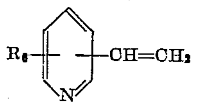

and

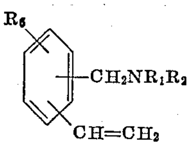

wherein $R_1$, $R_2$ and $R_6$ are hydrogen or lower alkyl.

The alpha-beta unsaturated polymerizable co-monomer selected may be exemplified by ethylenically unsaturated polymerizable monomeric materials, such as for example, methyl, ethyl, butyl, and 2-ethylhexyl acrylates, methyl, ethyl, butyl and hexyl methacrylates, styrene, vinyl acetate, vinyl chloride, vinylidene chloride, itaconic acid esters of alcohols containing up to 8 carbon atoms, butadiene, acrylonitrile, isoprene, isobutylene, ethylene, propylene, and the like.

In the most preferred form of this invention, the co-monomer utilized comprises at least two of such alpha-beta unsaturated polymerizable monomeric materials. In this most preferred form of the invention the materials used as co-monomers in the production of the copolymeric latices are selected to include at least one co-monomer that is conventionally polymerizable to a permanently soft, tacky, film-forming material, said co-monomer being present in the copolymer in an amount of from 25 to 65 percent by weight, and the other co-monomer is selected from monomeric materials which are conventionally polymerizable to a hard, brittle, high melting, nonfilm-forming material, and are present in the copolymer in amounts of from about 30 to about 70 percent by weight.

It should be understood that the film-forming or non-film-forming characteristics of the polymer refers to these properties when the polymeric materials are cast from the dispersed or latex form under ordinary room temperature conditions.

Exemplary of monomeric materials which may be polymerized to permanently soft, tacky, film-forming materials are ethyl acrylate, methyl acrylate, butyl acrylate and 2-ethylhexyl acrylate. Exemplary of monomeric materials which are polymerizable to hard, brittle, high melting, nonfilm-forming compositions when cast from a latex at room temperatures are methyl methacrylate, ethyl methacrylate, styrene, acrylonitrile and vinyl acetate.

It is likewise possible to utilize small amounts of co-monomers containing acid radicals in conjunction with the other co-monomers in the production of the copolymers of the present invention. These materials are incorporated for freeze-thaw and mechanical stability. They may be used in small amounts to replace a portion of the co-monomeric material or materials; however, if used in any appreciable amount, would diminish the alkali resistance of the polymers. Accordingly, when these materials are used in the interpolymers of this invention they should be present in amounts of less than about 5 percent by weight of the total polymer, and more specifically in amounts of from about 1 to about 5 percent. A typical acid sensitive polymer composition using monomers containing acid groups comprises the following components:

| | Percent |
|---|---|
| Methyl methacrylate | 40 |
| Ethyl acrylate | 40 |
| Tertiarybutylaminoethyl methacrylate | 15 |
| Methacrylic acid | 5 |

The polymers described in the foregoing are readily prepared by well known emulsion polymerization techniques, using free radical or peroxide type catalysts. These polymeric materials produced in the latex form have an average polymer particle size of up to about 3 or 4 microns, and preferably up to about 0.1 micron for use in floor polishes, waxes and the like. The most preferred average particle size is up to about 0.05 micron.

The improved process of this invention is carried out by the introduction of the amine monomer component as an amine monomer enriched premix fraction or fractions in the emulsion polymerization process. The term "enriched" as used in this context means in a percentage concentration with respect to the premix fraction that is greater than the percentage of amine monomer with respect to total monomeric constituents in the polymeric product. Of course the particular percentages set forth therein are indicative of the degree of enrichment which is desired in this process. Thus in the broader aspects of the process, amine-monomer is present in the premix fraction in amounts of from 10 to 100 percent by weight, and said premix fraction constitutes from 10 to 70 percent by weight of the total monomeric constituents. Of course the premix fraction contains the balance required to make 100 percent of an unsaturated polymerizable co-monomer of the class previously described, or more specifically, from zero to 90 percent. In the most preferred procedure the amine monomer enriched premix fraction contains from 15 to 90 percent amine monomer, and from 10 to 85 percent by weight of alpha-beta unsaturated co-monomer and said premix fraction constitutes from 30 to 55 percent by weight of the total monomeric constituents. It should be understood that the percentages referred to herein have reference to monomeric constituents only and do not include diluents, carriers, additives or other materials which are used in conjunction with the monomers in the polymerization process.

Generally the process of this invention involves the use of conditions and procedures which are conventional in aqueous emulsion polymerization techniques. Broadly, the temperatures utilized may range from about 30 to 150° C. and in the most preferred form from about 30 to 90° C. In low temperature polymerization techniques a redox catalyst system, such as that obtained by the use of ferrous salts in the presence of peroxides and sodium bisulfite, may be used to advantage. The catalysts which are useful in this polymerization reaction include peroxide catalysts, such as ammonium persulfate, potassium persulfate, benzoyl peroxide, t-butyl hydroperoxide, methylethylketone peroxide, hydrogen peroxide, and the azonitriles. The aqueous emulsion polymerization process is carried out in conjunction with and in the presence of surface active or emulsifying agents in the water, preferably those of the anionic or nonionic class. Generally the surface active or emulsifying agent is used in amounts of from 0.5 to 13 percent by weight of total solids in the final latex product and on a total latex basis the amount of surfactant is from about 0.2 to 5.2 percent by weight. In the specific instance of an anionic emulsifier or surfactant it is preferably present in amounts of from 1 to 10 percent on total polymer solids and from 0.4 to 4 percent on a total latex basis. In the case of nonionic surfactants the preferred range is 0.5 to 3 percent on a polymer solids basis and from 0.2 to 1.2 percent on a total latex basis. Examples of nonionic surfactants utilized include alkylpoly(ethyleneoxy)ethanols, alkylphenoxypoly(ethyleneoxy)ethanols, alkylpoly(propyleneoxy)ethanols, alkanol amides, such as those derived from diethanolamine and coconut oil fatty acids. Exemplary of anionic emulsifiers are sodium lauryl sulfate (Duponol WAQE), Complex organic phosphate ester sold under the trademark Gafac RE-610, alkylaryl sulfonate (Ultrawet K), and sodium lauryl ether sulfates (Sipon ESY).

The time of polymerization is not critical and it should be understood that utilizing certain catalyst systems, such as for example, redox systems, the polymerization is carried out in a relatively short time. Accordingly the time of polymerization may as a practical matter extend from about 15 to about 240 minutes, although for most purposes from about 30 to 180 minutes are adequate.

As indicated in the foregoing, the improved process of the present invention permits the amount of amine containing monomer in the copolymer of the latex to be reduced substantially on an over-all basis, however retaining the alkali resistance and acid sensitivity which is exhibited by films cast from copolymeric latex materials which contain substantially higher amounts of amine monomer. For example, by introducing and polymerizing the amine monomer in a fraction of the total monomeric materials in which fraction the amine monomer constitutes a substantially higher percentage of the total monomers as compared with its over-all percentages, the benefits of acid removability are substantially enhanced. Thus an acid sensitive copolymeric material obtained by the emulsion polymerization of a monomer admixture of 20 percent of amine-containing monomer and 80 percent unsaturated co-monomer can be essentially duplicated with respect to acid removability by the division of total monomers in a manner so as to provide an amine enriched premix fraction which is introduced at some point in the course of the polymerization reaction, although the final amine monomer content of the resulting copolymeric latex is substantially less than as described above. The point of introduction of the amine enriched premix fraction is not critical and accordingly it may be introduced at the beginning, in the middle, or at the end of the polymerization reaction.

Likewise several amine rich monomer premix fractions can be utilized, such as for example, at the initial stage of the polymerization reaction and at the end with an intermediate polymerization of other monomeric constituents.

| | Parts by weight |
|---|---|
| Water | 4430 |
| Alkylpoly(ethyleneoxy)ethanol [Emulphogene BC–840] | 45 |
| Organic phosphate ester surfactant [Gafac RE–610] | 150 |
| Ammonium persulfate | 10 |
| Methyl methacrylate | 1580 |
| Ethyl acrylate | 1204 |
| Tertiarybutylaminoethyl methacrylate | 226 |
| Tertiarybutyl hydroperoxide | 0.6 |
| Ammonium hydroxide (28–30%) | 140 |
| Phenyl mercuric acetate solution (Butrol) | 2.6 |
| Formalin | 11 |

The above materials are utilized in the preparation of a copolymer by the following polymerization procedure:

Into a glass-lined polymerization vessel fitted with a stirrer, thermometer, reflux condenser and heating element, containing 4250 parts water heated to 85° C., are added in sequence 45 parts Emulphogene BC–840, 75 parts of Gafac RE–610, and 20 parts ammonium hydroxide. The pH of the solution is about 9 to 9.5. To the solution was added 10 parts ammonium persulfate dissolved in 100 parts water. To the solution maintained at 80–83° C. was added Monomer Premix A, comprising 1024 parts of methyl methacrylate and 782 parts ethyl acrylate, continuously over a 40 minute period. After addition of Monomer Premix A was complete, Monomer Premix B, comprising 556 parts methyl methacrylate, 422 parts ethyl acrylate, 226 parts tertiarybutylaminoethyl methacrylate and 75 parts of emulsifier (Gafac RE–610), was slowly added over a 30 minute period during which time the temperature was maintained at 82–85° C.

After addition of the Monomer Premix B was completed, heating was continued at 83–88° C. for 10 minutes followed by the addition of a mixture of 0.6 parts of tertiarybutyl hydroperoxide in 120 parts of ammonium hydroxide and 40 parts of water. Additional heating and stirring was continued for a period of 30 minutes and the

TABLE I

| Example Number | Net Monomer Ratios [10] | | | | Monomer Mix A [10] | | | Monomer Mix B [10] | | | A/B Ratio | Percent Amine in Premix A or B | Percent of Total Monomer in Amine Premix |
|---|---|---|---|---|---|---|---|---|---|---|---|---|---|
| | MMA [1] | EA [2] | Amine [3] | Others | MMA [1] | EA [2] | Amine [11] | MMA [1] | EA [2] | Amine [11] | | | |
| I | 52.5 | 40 | 7.5 | ---------- | 34 | 26 | ---------- | 18.5 | 14 | 7.5 | 60/40 | 18.7 | 40 |
| II | 52.5 | 40 | 7.5 | ---------- | 18.5 | 14 | 7.5 | 34 | 26 | ---------- | 40/60 | 18.7 | 40 |
| III | 55 | 40 | 5 | ---------- | 40.5 | 29.5 | ---------- | 14.5 | 10.5 | 5 | 70/30 | 16.6 | 30 |
| IV | 52.5 | 40 | [4] 7.5 | ---------- | 34 | 26 | ---------- | 18.5 | 14 | [4] 7.5 | 60/40 | 18.7 | 40 |
| V | 52.5 | 40 | [9] 7.5 | ---------- | 34 | 26 | ---------- | 18.5 | 14 | [9] 7.5 | 60/40 | 18.7 | 40 |
| VI | 18.5 | 40 | 7.5 | [5] 34 | [5] 34 | 26 | ---------- | 18.5 | 14 | 7.5 | 60/40 | 18.7 | 40 |
| VII | 60 | 30 | 10 | ---------- | 26.8 | 13.2 | 10 | 33.2 | 16.8 | ---------- | 50/50 | 20.0 | 50 |
| VIII | 60 | [6] 30 | 10 | ---------- | 26.8 | [6] 13.2 | 10 | 33.2 | [6] 16.8 | ---------- | 50/50 | 20.0 | 50 |
| IX | ---------- | 32.5 | 7.5 | [5] 60 | [5] 5 | 27.5 | 7.5 | [5] 55.0 | 5 | ---------- | 40/60 | 18.7 | 40 |
| X | ---------- | 32.5 | 7.5 | [5] 60 | ---------- | 17.5 | 7.5 | [5] 60.0 | 15 | ---------- | 25/75 | 30.0 | 25 |
| XI | 55 | 35 | 10 | ---------- | ---------- | ---------- | 10 | 55.0 | 35 | ---------- | 10/90 | 100.0 | 10 |
| XII | ---------- | 17 | 7.5 | [5] 65.5<br>[7] 10.0 | [5] 35 | ---------- | ---------- | [5] 20.5 | 17<br>[7,8] 10 | 7.5 | [8] 35/55/10 | 13.6 | 55 |
| XIII | 35 | 55 | 10 | ---------- | 15.55 | 24.45 | 10 | 19.45 | 30.55 | ---------- | 50/50 | 20.0 | 50 |

[1] Methyl methacrylate, unless other specified.
[2] Ethyl acrylate, unless other specified.
[3] Tertiarybutylaminoethyl methacrylate, unless other specified.
[4] 2-Morpholinoethyl methacrylate.
[5] Styrene.
[6] Isobutyl acrylate.
[7] 2-Ethylhexyl acrylate.
[8] A third monomer premix C was added after polymerization of premixes A and B. Premix C was styrene in an amount of 10% of total net monomers.
[9] Diethylaminoethyl methacrylate.
[10] The ratios are in terms of percent of total or net monomers used.
[11] The Gafac RE-610 (75 parts) is added with the amine monomer premix.

For a more complete understanding of the improved process of this invention, reference is made to the following specific examples.

*Example I*

The following materials are utilized in the preparation of a polymeric material by the process of the present invention:

reaction mixture was then cooled to 25° C. followed by the addition of the formalin and Butrol in 40 parts of water. The latex was filtered and the final product had a solids content of 40% and an average particle size of less than 0.05 micron.

Table I above illustrates additional examples prepared by the procedure of Example I. In some cases the amine monomer was added in Premix B, and in others in Premix A.

The procedure and materials used in Example XIII appearing in the table, differed slightly from Example I. The detailed procedure is as follows: This latex is useful as an acid sensitive paint latex.

*Example XIII*

RAW MATERIALS

| | Parts |
|---|---|
| Water (deionized) | 557.7 |
| Alkylphenoxypoly(ethyleneoxy)ethanol (Igepal CO–730) | 13.6 |
| Gafac RE–610 | 11.5 |
| Cellosize WP–09 (trademark for hydroxyethylcellulose) | 0.68 |
| Ammonium persulfate | 2.0 |
| Methyl methacrylate | 158.9 |
| Ethyl acrylate | 249.7 |
| Tertiarybutylaminoethyl methacrylate | 45.4 |
| Tertiarybutyl hydroperoxide | 0.5 |
| Ammonium hydroxide (28–30%) | 24.0 |
| Butrol | 0.3 |
| Formalin | 0.06 |

EQUIPMENT

A two liter glass round bottom flask equipped with a stirrer, thermometer, reflux condenser, monomer addition inlet tube and a heating element.

PROCEDURE

*Step 1.*—Charged 515 parts of deionized water to the reactor. Heated to 85° C. Stirring was begun.

*Step 2.*—Added 5.75 parts of Gafac RE–610 and 13.6 parts of Igepal CO–730.

*Step 3.*—Added 4 parts $NH_4OH$.

*Step 4.*—Added 0.68 part of Cellosize WP–09 (22.7 parts of a 3% solution).

*Step 5.*—Added a solution of 2 parts of ammonium persulfate in 10 parts $H_2O$.

*Step 6.*—After addition of ammonium persulfate, addition was begun of monomer mixture A which comprised:

| | Parts |
|---|---|
| Methyl methacrylate | 70.6 |
| Ethyl acrylate | 111.0 |
| Tertiarybutylaminoethyl methacrylate | 45.4 |
| Gafac RE–610 | 5.75 |

Addition time was 25–30 minutes. Temperature was maintained at 83–85° C.

*Step 7.*—Immediately after completion of addition of Monomer Mixture A, addition was begun of Monomer Mixture B which comprised:

| | Parts |
|---|---|
| Methyl methacrylate | 88.2 |
| Ethyl acrylate | 138.8 |

*Step 8.*—After completion of addition of Monomer Mixture B, heating continued for 10 minutes at 83–85° C. Added 20 parts $NH_4OH$ and 0.5 parts of tertiarybutylhydroperoxide and continued stirring at 83–85° C. for 45 minutes.

*Step 9.*—Added a solution of 0.06 part formalin and 0.06 part Butrol in 10 parts $H_2O$. Cooled to room temperature with continued stirring.

The latex prepared as described above has the following properties:

| | | |
|---|---|---|
| Percent solids | | 46±0.5 |
| Viscosity (Brookfield viscometer #2 spindle)— | | |
| 6 r.p.m. | centipoises | 1600 |
| 12 r.p.m. | do | 1200 |
| 30 r.p.m. | do | 800 |
| 60 r.p.m. | do | 400 |
| Particle size | micron | 0.2 |

The latex of Example XIII may be formulated into an acid sensitive paint by the following procedure, using the components as listed:

MATERIALS

| | Parts |
|---|---|
| Rutile titanium dioxide | 2140 |
| Calcium carbonate | 470 |
| Talc | 830 |
| Diatomaceous silica | 930 |
| Diethylene glycol | 84 |
| Antifoamer | 21 |
| Boric acid | 63 |
| Ammonium hydroxide (28–30%) | 43 |
| Acrysol A–3 [1] (10% Ammonium salt in water) | 65 |
| Tamol 731 [2] (10% in water) | 65 |
| Triton X–102 [3] | 22 |
| Carboxymethyl cellulose (5% in water) | 159 |
| Interpolymer latex (Example XIII) | 4070 |
| Water | 3490 |

[1] Acrysol A–3 is the trademark for polyacrylic acid.
[2] Tamol 731 is the trademark for the sodium salt of a carboxylated polyelectrolyte.
[3] Triton X–102 is the trademark for isooctyl phenyl (polyethyleneoxy) ethanol.

PROCEDURE

All of the above ingredients, except the latex, are blended together in a Hobart mixer. Then the latex is added and the mixture is ground in a ball mill for 2 to 2½ hours. The resulting latex paint dries extremely fast and has immediate scrub resistance with water or detergents, but can be readily removed with dilute solutions of solvents and acids.

The following example will illustrate the production of an alkali-resistant, acid-sensitive interpolymer by a redox catalyst system.

*Example XIV*

The following materials are utilized in the polymerization:

| | Parts |
|---|---|
| Water (deionized) | 4650 |
| Nonylphenoxypoly(ethyleneoxy)ethanol (Igepal CO–990) | 130 |
| Ammonium persulfate | 15 |
| Sodium bisulfite | 5 |
| Ethyl acrylate | 1305 |
| Methyl methacrylate | 392 |
| Dimethylaminoethyl methacrylate | 261 |
| Acrylonitrile | 652 |
| Ammonium hydroxide (28%) | 20 |
| Phenyl mercuric acetate formulation (Butrol) | 2.6 |
| Formalin | 11 |

EQUIPMENT

Glass-lined polymerization vessel fitted with a stirrer, thermometer, nitrogen inlet, condenser and provisions for heating and cooling.

The above materials are utilized in the production of an acid sensitive interpolymer by the following redox procedure:

To 130 parts of Igepal CO–990 in 4400 parts of deoxygenated water at room temperature was added 10 parts of ammonium persulfate catalyst dissolved in 100 parts of water. To the reaction mixture was added 5 parts of sodium bisulfite dissolved in 50 parts water. An admixture of Monomer Premix A of the following composition was added over a thirty minute period.

| Monomer Premix A: | Parts |
|---|---|
| Ethyl acrylate | 783 |
| Methyl methacrylate | 134 |
| Acrylonitrile | 652 |

During the addition period the temperature was permitted to rise from room temperature to about 45–50° C., and maintained at this temperature throughout the monomer addition. About ten minutes after the completion of the addition of Monomer Premix A, the addition of Monomer Premix B, over a period of about twenty minutes at a temperature of from 40–45° C. is carried out. The premix was constituted as follows:

| Monomer Premix B: | Parts |
|---|---|
| Ethyl acrylate | 522 |
| Methyl methacrylate | 258 |
| Dimethylaminoethyl acrylate | 261 |

About ten minutes after the addition of Premix B a solution of 5 parts of ammonium persulfate in 50 parts water was added, followed by further polymerization at 80–85° C. for a period of 30 minutes. The reaction mixture was then cooled to 25° C. and the ammonium hydroxide, formalin and butrol added. The final pH was 9.0–9.5. The resulting latex was filtered to produce a product having a solids content of 36%. The over-all composition of the interpolymer was:

| | Percent |
|---|---|
| Ethyl acrylate | 50 |
| Acrylonitrile | 25 |
| Methyl methacrylate | 15 |
| Dimethylaminoethyl methacrylate | 10 |

Monomer Premix B constituted 40% of the total monomers, the concentration of amine monomer in Premix B was 25%.

The following examples will further illustrate the preparation of finishing compositions and polishes.

*Example XV*

SELF POLISHING LIQUID FLOOR POLISH

A floor polish formulation is prepared utilizing the interpolymer latices obtained in Example I. The ingredients listed below are dispersed in water to form a uniform aqueous emulation:

| | Parts |
|---|---|
| Interpolymer latex 40% solids (Example I) | 300 |
| Water | 500 |
| Alkali-soluble leveling resin (15% solids) (maleic anhydride-rosin, Shanco 334) | 100 |
| Polyethylene wax emulsion (15% solids) | 100 |
| Tributoxyethyl phosphate | 6 |
| Diethylene glycol monoethyl ether | 16 |
| Nonylphenoxypoly(ethyleneoxy)ethanol (Igepal CO–630) | 6.5 |
| Fluorocarbon leveling agent (½% solids) (FC–134, trademark for a perfluorinated alkylamide) | 10 |

After mixing and complete dispersion of the above ingredients, the floor polish composition may be applied to an asphalt, vinyl, linoleum, rubber, vinyl-asbestos tile surface. The polish dries to give a bright, uniform, glossy film. The film is impervious to the action of soap and water but is readily removed by a dilute solution containing 0.5% phosphoric acid, 0.5% nonylphenoxypoly(ethyleneoxy)ethanol (Igepal CO–730) and 1.0% ethylene glycol monobutyl ether (butyl Cellosolve).

*Example XVI*

BUFFABLE FLOOR FINISH

The following ingredients are formulated into an emulsion as described in Example XV:

| | | |
|---|---|---|
| Interpolymer latex (40% solids) (Example VII) | parts | 130 |
| Water | do | 220 |
| Oxidized microcrystalline wax emulsion (15% solids) (Petrolite C–7500) | parts | 350 |
| Carnauba wax emulsion (15% solids) | do | 200 |
| Alkali-soluble leveling resin (15% solids) (Durez 19551), trademark for maleic acid modified resin | parts | 100 |
| Nonylphenoxypoly(ethyleneoxy)ethanol (Igepal CO–610) | parts | 5 |
| Polyethylene glycol dibenzoate (Benzoflex P–600) | parts | 5 |
| N-methyl-2-pyrrolidone | do | 20 |
| Formalin | parts | 1.5 |
| Total solids | percent | 15 |

The foregoing composition, when applied to asphalt, linoleum or rubber tile, dries to a smooth, glossy film which can be buffed to a high gloss. The film is resistant to alkaline cleaners but is removable by formulations containing acetic or tartaric acid. An aqueous solution containing 2% tartaric acid, 5% isopropyl alcohol, and 1% nonylphenoxypoly(ethyleneoxy)ethanol (Igepal CO–730) is an effective stripping formulation.

From the foregoing examples it may be seen that the novel copolymers produced by the processes claimed herein are useful in the preparation of a broad variety of protective coatings, finishes, polishes and the like. The resulting compositions are readily removable with dilute acid solutions, but are resistant to alkali solutions or soaps, detergents or the like.

While several particular embodiments of this invention are suggested above, it will be understood of course that the invention is not to be limited thereto since many modifications may be made and it is contemplated therefore by the appended claims to cover any such modifications as fall within the true spirit and scope of this invention.

We claim:

1. In a process for preparing an alkali resistant, acid sensitive interpolymer latex by interpolymerizing a total of from about 5 to 25 percent by weight of a monomeric ethylenically unsaturated amine, and from about 75 to 95 percent by weight of at least one alpha-beta unsaturated polymerizable co-monomer by an aqueous emulsion interpolymerization reaction, the improvement which comprises carrying out said interpolymerization by a multistage polymerization process, in which at least one stage comprises adding and polymerizing an ethylenically unsaturated amine-monomer enriched fraction, the ethylenically unsaturated amine-monomer proportion of said amine-monomer enriched fraction being always greater than said total percent of ethylenically unsaturated amine-containing monomer in said interpolymer and being present in an amount of from 10 to about 100 percent by weight of said fraction, and wherein said fraction constitutes from 10 to 70 percent by weight of the total monomeric constituents, and the other stage or stages of which comprises adding and polymerizing the remainder of said monomeric constituents in a fraction or fractions nonenriched in the ethylenically unsaturated amine-monomer component, to provide said interpolymer latex.

2. The product of the process of claim 1.

3. A process according to claim 1 wherein the ethylenically unsaturated amine is present in the enriched premix fraction in an amount of from 15 to 90 percent by weight thereof.

4. A process according to claim 1 wherein the ethylenically unsaturated amine enriched fraction constitutes from 30 to 55 percent by weight of the total monomeric constituents.

5. A process according to claim 1 wherein the ethylenically unsaturated amine is selected from the group consisting of vinyl pyridine, ethylpyridylethyl acrylate, vinylbenzylamine, vinylphenylamine, N-methyleneaminoacrylamide and compounds of the formula

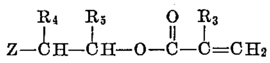

wherein Z is selected from the group consisting of piperidino, morpholino and amino radicals of the structure

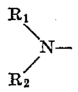

wherein $R_1$, $R_2$, $R_4$ and $R_5$ are selected from the group consisting of hydrogen and lower alkyl and $R_3$ is selected from the group consisting of hydrogen and methyl.

6. A process according to claim 1 wherein the alpha-beta unsaturated co-monomer comprises an admixture of from 25 to 65 percent by weight of at least one co-monomer that is conventionally polymerizable into a permanently soft, tacky, film-forming polymer and from 30 to 70 percent by weight of at least one hardening co-monomer that is conventionally polymerizable to a hard, brittle, high-melting, non-film-forming composition by an aqueous polymerization reaction.

References Cited by the Examiner

UNITED STATES PATENTS

| | | | |
|---|---|---|---|
| 2,232,595 | 2/1941 | Dittmar et al. | 260—28.5 |
| 2,412,476 | 12/1946 | Semegen | 260—86.1 |
| 2,739,137 | 3/1956 | Fowler | 260—29.6 |
| 2,862,902 | 12/1958 | Pritchard | 260—86.1 |
| 3,073,791 | 1/1963 | Barkhuff | 260—29.6 |

MURRAY TILLMAN, *Primary Examiner.*

WILLIAM H. SHORT, SAMUEL H. BLECH, *Examiners.*

J. NORRIS, W. J. BRIGGS, *Assistant Examiners.*